US009378735B1

(12) United States Patent
Garimella et al.

(10) Patent No.: US 9,378,735 B1
(45) Date of Patent: Jun. 28, 2016

(54) ESTIMATING SPEAKER-SPECIFIC AFFINE TRANSFORMS FOR NEURAL NETWORK BASED SPEECH RECOGNITION SYSTEMS

(71) Applicant: Amazon Technologies, Inc., Reno, NV (US)

(72) Inventors: Sri Venkata Surya Siva Rama Krishna Garimella, Seattle, WA (US); Bjorn Hoffmeister, Seattle, WA (US); Nikko Strom, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 14/135,474

(22) Filed: Dec. 19, 2013

(51) Int. Cl.
*G10L 15/16* (2006.01)
*G10L 15/06* (2013.01)
*G10L 15/20* (2006.01)
*G10L 13/08* (2013.01)

(52) U.S. Cl.
CPC ........................................ *G10L 15/16* (2013.01)

(58) Field of Classification Search
CPC ......... G10L 15/06; G10L 15/20; G10L 15/16; G10L 13/08
USPC ........................... 704/233, 244, 257, 260, 232
See application file for complete search history.

(56) References Cited

U.S. PATENT DOCUMENTS

| 8,346,551 | B2* | 1/2013 | Herbig | G10L 15/065 704/244 |
| 2013/0080173 | A1* | 3/2013 | Talwar | G10L 25/69 704/260 |
| 2013/0096915 | A1* | 4/2013 | Rennie | G10L 21/0208 704/233 |
| 2014/0210830 | A1* | 7/2014 | Latorre-Martinez | G10L 21/10 345/473 |
| 2014/0278425 | A1* | 9/2014 | Jost | G10L 15/063 704/257 |
| 2015/0042662 | A1* | 2/2015 | Latorre-Martinez | G10L 21/10 345/473 |
| 2015/0052084 | A1* | 2/2015 | Kolluru | G06T 13/40 706/11 |

OTHER PUBLICATIONS

Lei et al. "Deep Neural Networks with Auxiliary Gaussian Mixture Models for Real-Time Speech Recognition", May, 2013, IEEE, pp. 7634-7638.*
Lei et al., "Deep Neural Networks with Auxiliary Gaussian Mixture Models for Real-Time Speech Recognition", May 2013, IEEE, pp. 7634-7638.*

(Continued)

*Primary Examiner* — Pierre-Louis Desir
*Assistant Examiner* — Seong Ah A Shin
(74) *Attorney, Agent, or Firm* — Knobbe, Martens, Olson & Bear, LLP

(57) ABSTRACT

Features are disclosed for estimating affine transforms in Log Filter-Bank Energy Space ("LFBE" space) in order to adapt artificial neural network-based acoustic models to a new speaker or environment. Neural network-based acoustic models may be trained using concatenated LFBEs as input features. The affine transform may be estimated by minimizing the least squares error between corresponding linear and bias transform parts for the resultant neural network feature vector and some standard speaker-specific feature vector obtained for a GMM-based acoustic model using constrained Maximum Likelihood Linear Regression ("cMLLR") techniques. Alternatively, the affine transform may be estimated by minimizing the least squares error between the resultant transformed neural network feature and some standard speaker-specific feature obtained for a GMM-based acoustic model.

20 Claims, 5 Drawing Sheets

(56) References Cited

OTHER PUBLICATIONS

Thelen et al., "Speaker Adaptation in the Philips System for Large Vocabulary Continuous Speech Recognition", 1997, IEEE, pp. 1035-1038.*

Digalakis et al., "Rapid Speech Recognizer Adaptation to New Speakers", 1999, IEEE, pp. 765-768.*

Povey et al. "A Basis Method for Robust Estimation of Constrained MLLR", 2011, IEEE, pp. 4460-4463.*

* cited by examiner

ESTIMATING SPEAKER-SPECIFIC AFFINE TRANSFORMS FOR NEURAL NETWORK BASED SPEECH RECOGNITION SYSTEMS

BACKGROUND

Computing devices can be used to process a user's spoken commands, requests, and other utterances into written transcriptions. In a common application, a user can speak into a microphone of a computing device, and an automated speech recognition module executing on the computing device can process the audio input and determine what the user said. Additional modules executing on the computing device can process the transcription of the utterance to determine what the user meant and/or perform some action based on the utterance. Automatic speech recognition ("ASR") modules typically include an acoustic model and a language model. The acoustic model is used to generate hypotheses regarding which subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

There can be two different types of ASR modules: speaker-independent and speaker-specific or environment-specific. In speaker-independent ASR modules, models are trained with data from multiple speakers. In speaker-specific or environment-specific ASR modules, models are trained with data from individual users or environments. Such systems identify individual users or environments as part of their operation. For example, individual users or environments can be identified from spoken utterances. In a simple case, a user can identify himself by name or by using some other identifier. In other cases, the automatic speech recognition process generates a transcript of the user's utterance that is used to determine the speaker's identity. For example, a user can be identified using acoustic models customized for speaker identification. Such speaker-specific models are trained to maximize the likelihood scores for specific users when processing utterances made by those users. The likelihood scores indicate the probabilities that particular utterances were actually made by the user. ASR modules that use such speaker-specific models commonly utilize hidden Markov models-Gaussian mixture models ("HMM-GMM") for vocabulary tasks. In some cases, instead of using Gaussian mixture models ("GMMs"), artificial neural networks ("NNs"), including deep neural networks, may be used with HMMs to perform such tasks. A neural network used with an HMM is referred to as an HMM-NN. A GMM or NN acoustic model can be trained as a speaker-independent acoustic model by using data from a multitude of speakers. A speaker-specific acoustic model may then be adapted or derived from the speaker-independent acoustic model. Adapting or deriving a speaker-specific acoustic model from a speaker-independent acoustic model requires less data and training time than newly generating a speaker-specific acoustic model.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
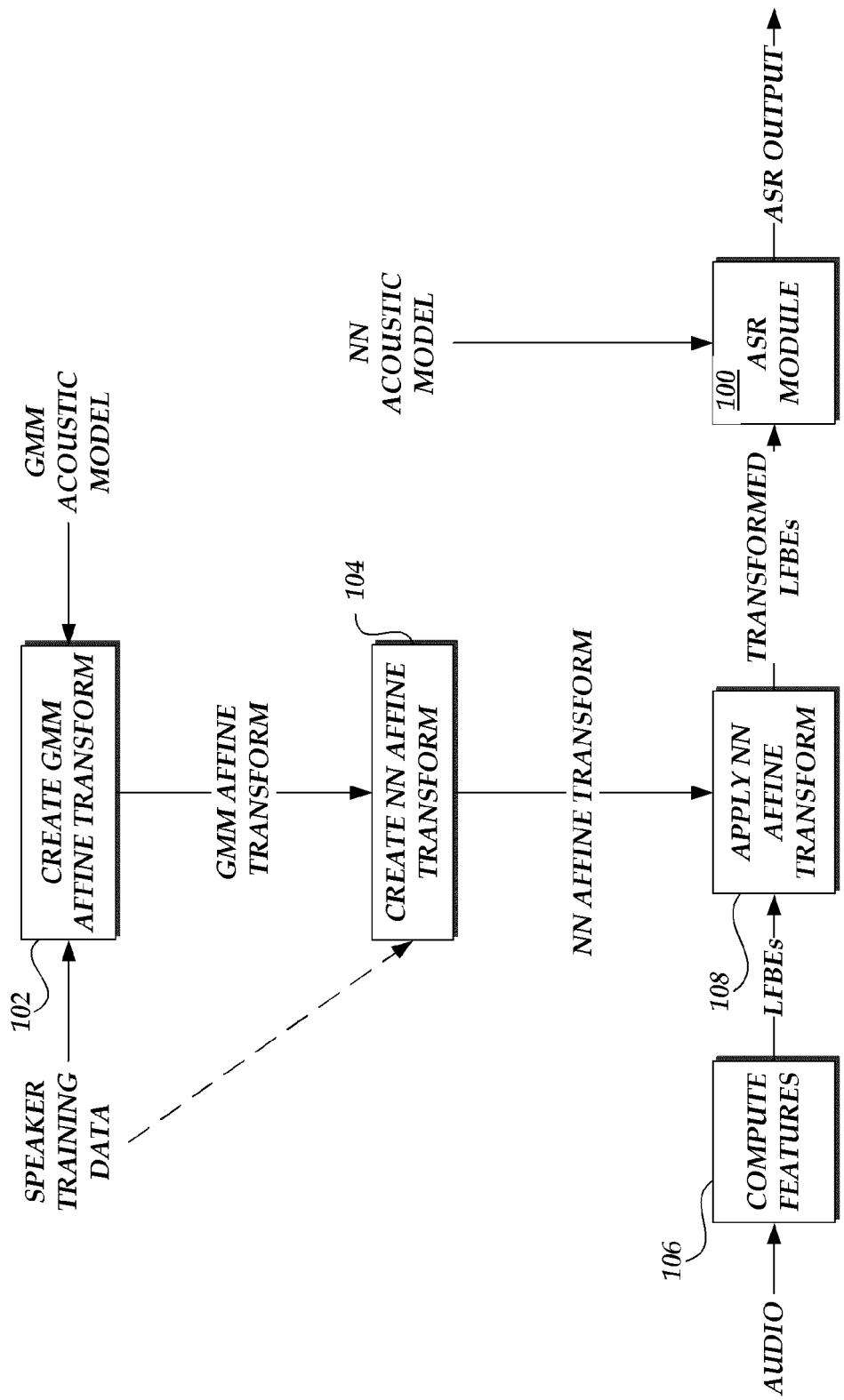
FIG. 1 is a block diagram of an illustrative process for estimating speaker-specific transforms for an NN-based acoustic model.

Speech recognition systems may use acoustic models to understand the words spoken in an utterance. Acoustic models may include models for the sounds in a language (e.g., phonemes) so that the sounds can be recognized and ultimately used to recognize the words that were spoken. Traditionally, acoustic models have used a Gaussian mixture model ("GMM"). An acoustic model may be speaker-independent or speaker-specific. A speaker-specific model may provide better speech recognition in that the acoustic model may be adapted to the specific voice of the speaker. A common technique for creating a speaker-specific model uses a transform created using constrained maximum likelihood linear regression ("cMLLR").

The process of using a cMLLR transform to do speaker-specific speech recognition with a GMM may proceed, for example, as follows. First, audio data is received and converted into a sequence of frames. Each frame is then processed to create a speaker-specific feature vector (or transformed feature vector) using a sequence of steps, such as the following: (1) compute a log filter bank energy ("LFBE") vector, (2) create a concatenated LFBE vector, (3) create a feature vector (such as mel-frequency cepstral coefficients, or "MFCCs"), (4) apply a global cMLLR transform, and (5) apply a speaker-adaptive cMLLR transform.

More recently, acoustic models have used artificial neural networks ("NN"), including but not limited to deep neural networks. An NN-based acoustic model may also use LFBE vectors as inputs. It is desired to create a speaker-specific NN model using a cMLLR transform. However, the above techniques are not applicable. In one example, it is desired to create a speaker-specific cMLLR transform that operates on LFBE vectors and improves the performance of an NN-based acoustic model. A least squares minimization approach may be used to determine a cMLLR transform of LFBE vectors for use with a NN-based acoustic model.

An LFBE vector represents the level of energy in different frequency bands of the signal. For example, an LFBE vector may be of length twenty and indicate the energy in twenty different frequency bands. The frequency bands may be on a mel scale or spaced linearly. In one example, an LFBE vector may be computed as follows: (1) compute a Fourier transform of a frame of a signal, (2) convert the spectrum to a mel scale using triangular overlapping windows, and (3) take the logarithm of each energy value.

A concatenated LFBE vector may comprise the concatenation of a sequence of LFBE vectors into a single vector. This concatenation may be performed for each frame. For example, a concatenated LFBE vector may be a concatenation of nine sequential LFBE vectors. For an $n^{th}$ frame, the concatenated LFBE vector may comprise the LFBE vectors from frame n−4 to frame n+4.

Aspects of this disclosure relate to two different estimation techniques for adapting speaker-specific or environment-specific affine transforms for a neural network acoustic model. The first technique involves minimizing two functions relating to differences between an affine transform for a GMM-based acoustic model and an affine transform for an NN-based acoustic model. Minimizing a first function may be used to generate a linear portion of an affine transform for an NN-based acoustic model, and minimizing a second function may be used to generate a bias portion of an affine transform for an NN-based acoustic model. The second technique involves minimizing a function relating to differences between feature vectors computed using an affine transform for a GMM-based acoustic model and feature vectors computed using an affine transform for an NN-based acoustic model.

These techniques may be used to estimate speaker-specific or environment-specific transforms in advance. For example, the affine transforms for an NN-based acoustic model may be created before an utterance is received. The NN affine transforms may be created using GMM affine transforms previously calculated from speaker training data consisting of multiple utterances. This may be useful for utterances where the decoding must happen in real-time and a current utterance may not be decoded for computing the transform. For example, a user may make an utterance to his or her cellular phone and expect the phone to immediately perform a specific action in response to the utterance. The current utterance may be used for accumulating statistics and subsequently updating the NN affine transform.

Alternatively, these techniques may be used to estimate transforms for a specific utterance. In this embodiment, affine transforms may be estimated for each utterance. This may be useful for utterances and/or audio data that do not require a real-time response. For example, the NN model may be decoding video data.

Although the examples and embodiments described herein will focus, for the purpose of illustration, upon estimating transformations of speaker-specific or environment-specific audio input features for an NN-based acoustic model, one skilled in the art will appreciate that the techniques described herein may be applied to other processes, methods, or systems and that an NN-based acoustic model is only one specific example. For example, the techniques may be used with any type of input feature transformation, or may be used with any type of artificial neural network system, including NN models handling tasks such as handwriting recognition, image recognition, etc. Various aspects of the disclosure will now be described with regard to certain examples and embodiments, which are intended to illustrate but not limit the disclosure.

Audio Processing in a Speaker-Specific NN-Based ASR Module

FIG. 1 shows an illustrative representation of performing speech recognition using an affine transform for an NN-based ASR module 100, where the affine transform was computed from an affine transform for a GMM-based acoustic model and a corpus of speaker training data. Where the identity of a speaker is known (e.g., using speaker recognition or from a device identifier), a speaker-specific affine transform can be used to improve speech recognition.

A general acoustic model (whether GMM or NN) may be trained using speech from a large number of users. The acoustic model may provide good speech recognition results for a large number of users because it was trained on data for a large number of users. A speaker-specific model may be created using only the speech of a single speaker. Such a model may provide better speech recognition results for the speaker because it is trained specifically for that speaker. It may not be practical, however, to create an acoustic model for each speaker. Instead, a speaker-specific affine transform can be used to improve speech recognition performance for a specific speaker using a general acoustic model. The speaker-specific affine transform may, in a sense, transform the speech of the specific user to more closely correspond to the speech of an average user as contained in the general acoustic model.

To create a speaker-specific affine transform a corpus of speaker training data for the speaker may be used. The corpus may include, for example, several hours of the user's speech along with a transcription of the speech. This speaker training data may be used to compute an affine transform for a GMM-based acoustic model at block 102 using known techniques. The speaker training data may be stored as an audio file or as feature vectors, such as LFBEs or MFCCs. The GMM affine transform may be created in advance and then deployed in a speech recognition system using a GMM-based ASR module. The affine transform may use cMLLR.

The affine transform for the GMM-based acoustic model may be used to create an affine transform for an NN-based acoustic model at block 104. The affine transform for the NN-based acoustic model may also be created in advance and then deployed in a speech recognition system using an NN-based ASR module 100. The affine transform for the NN-based acoustic model may be created as described in further detail below. In some embodiments, the speaker training data may be used in addition to the affine transform for the GMM-based acoustic model to calculate the affine transform for the NN-based acoustic model.

After the affine transform for the NN-based acoustic model is deployed, it may be used to transform features to improve speech recognition. When audio is received, features may be computed from the audio input at block 106. The audio input may be an audio utterance. The audio input may be converted into a sequence of feature vectors. For example, the feature vectors may be an LFBE feature vector or concatenated LFBE feature vectors.

The affine transform for the NN-based acoustic model calculated at block 106 may be applied to the feature vectors at block 108. For example, for each feature vector, a matrix multiplication may be performed with the linear portion of the affine transform and the feature vector. Then, the bias portion of the affine transform may be added. The NN-based ASR module 100 may receive the transformed feature vectors and perform automatic speech recognition to generate some output. The output may include, for example, text or a transcription of the audio utterance.

Figure 2:
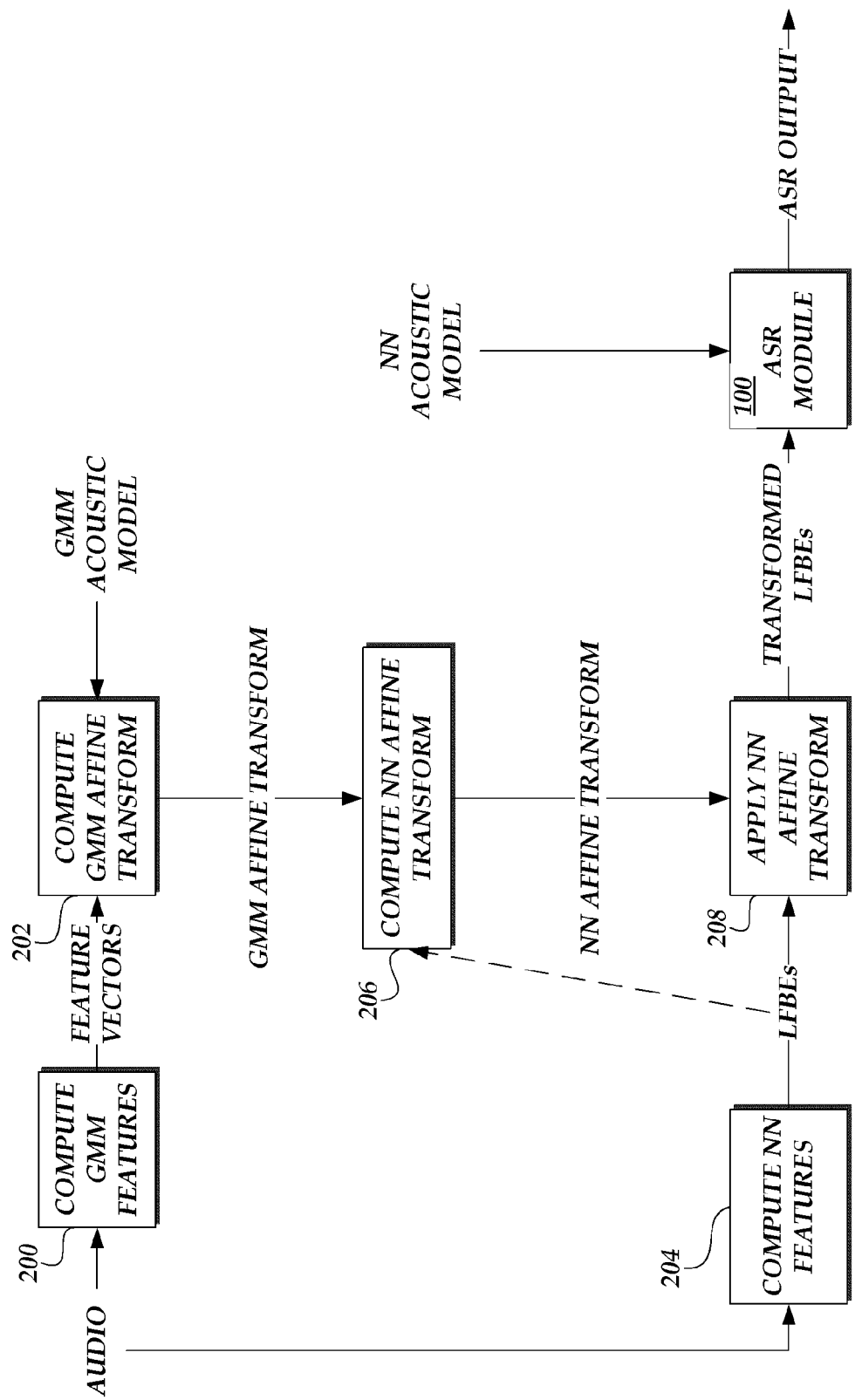
FIG. 2 is a block diagram of an illustrative process for estimating utterance-specific transforms for an NN-based acoustic model.

FIG. 2 shows an illustrative representation of performing speech recognition using an affine transform for an NN-based ASR module 100, where the affine transform was created using the audio input. These input feature vectors may be transformed using an utterance-specific affine transform estimated from an affine transform for a GMM-based acoustic model.

The audio input may be an audio utterance. The audio utterance may be converted into one or more sequences of feature vectors. In some embodiments, the feature vectors may comprise LFBE feature vectors, concatenated LFBE feature vectors, or MFCC feature vectors. The audio utterance may be used to compute GMM feature vectors at block 200. The GMM feature vectors may, for example, be MFCCs. The GMM feature vectors may have been processed using, for example, linear discriminate analysis and maximum likelihood linear transforms.

At block 202, an affine transform for a GMM-based acoustic model may be computed using known techniques. The affine transform for the GMM model may be applied to transform GMM feature vectors when processing an utterance using a GMM-based ASR module.

The audio input may also be used to compute NN feature vectors at block 204. These NN feature vectors may comprise, for example, LFBE feature vectors or concatenated LFBE feature vectors.

The affine transform for the GMM-based acoustic model may be used to compute an affine transform for an NN-based acoustic model at block 206 as described in greater detail below. The NN feature vectors may also be used along with the affine transform for the GMM-based acoustic model when computing the affine transform for the NN-based acoustic model at block 206.

The affine transform for the NN-based acoustic model calculated at block 206 may be applied to NN feature vectors at block 208. The affine transform for the NN-based acoustic model may transform the feature vectors into transformed feature vectors. The NN-based ASR module 100 may receive the transformed feature vectors and perform automatic speech recognition to generate some output. The output may include, for example, text or a transcription of the audio utterance.

Speaker-specific affine transforms may be useful when the current utterance is not suitable for computing the transform because real-time speech processing is desired. For example, a user may wish a device to immediately perform some action in response to the user's request. However, the current utterance may still be statistically useful. The current utterance may later be used, along with other speaker training data, to update the affine transform. The updated transform may be used for future utterances.

Utterance-specific transforms may be useful for recognizing speech inputs from multiple users. The utterance-specific affine transform does not require identification of a specific speaker as it is based on the given utterance rather than speaker training data. Additionally, using the current utterance for computing the transforms may be advantageous when the user does not expect an immediate response. For example, the speech processing system may be decoding data from a video.

Least Squares Approximation Techniques for cMLLR Transform in LFBE Space

Figure 3:
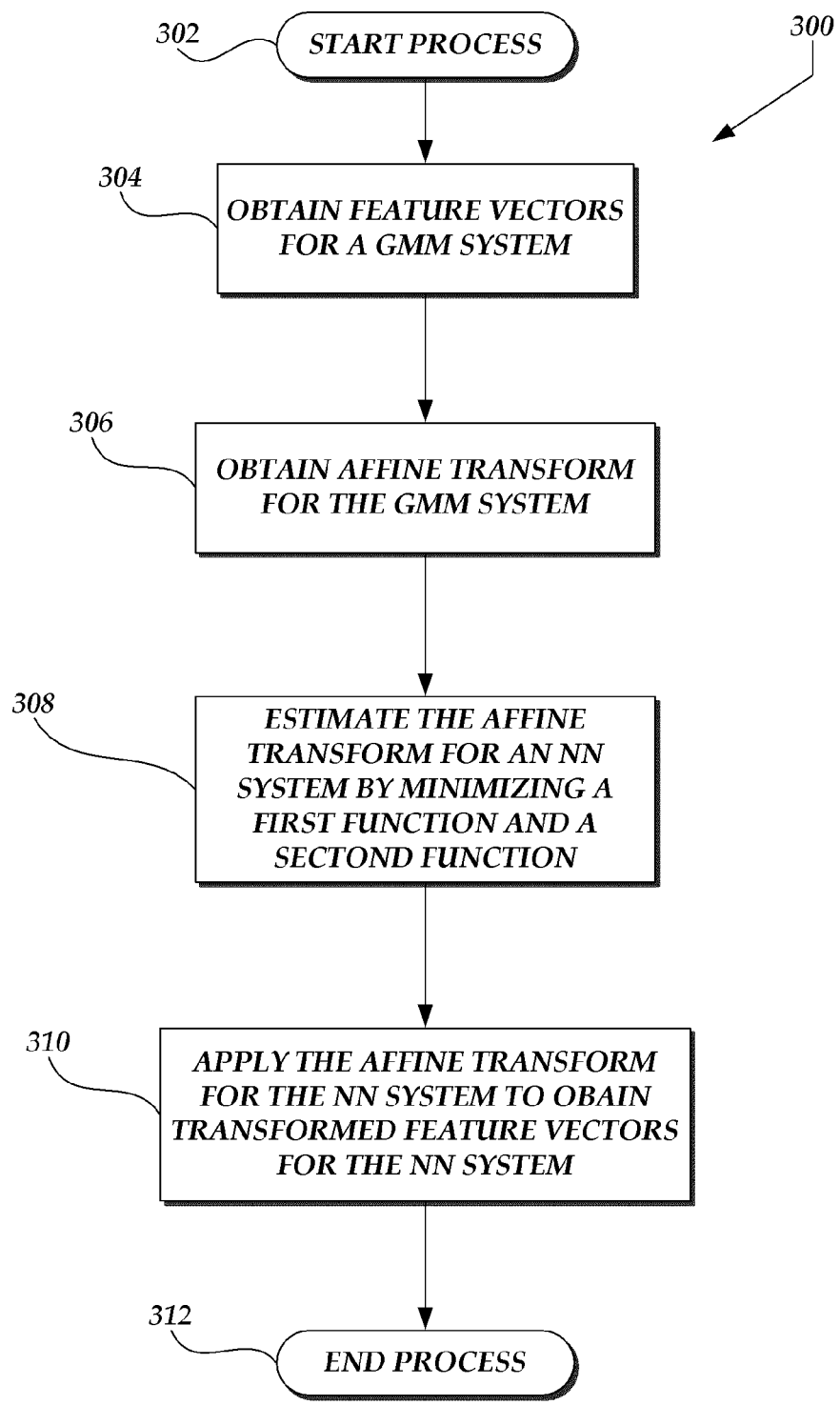
FIG. 3 is a flow diagram of an illustrative process for estimating affine transformations in log filter-bank energy space by minimizing feature discrepancy between corresponding transform terms in GMM-based acoustic models and NN-based acoustic models.

FIG. 3 illustrates a process 300 for obtaining an affine transform $\{A_f, b_f\}$ for an NN-based acoustic model. The process 300 begins at block 302. The process 300 may be embodied in a set of executable program instructions stored on a computer-readable medium, such as one or more disk drives, of a computer system. When the process 300 is initiated, the executable program instructions can be loaded into memory, such as RAM, and executed by one or more processors of the computer system.

At block 304, a sequence of feature vectors for a global GMM acoustic model may be obtained from audio input, as discussed above. The feature vectors may be derived from LFBEs. For example, the feature vector, represented by $x_t$ at time t, may be expressed as $$x_t = \left( A_g MLD_b \begin{bmatrix} f_{t-4} \\ f_{t-3} \\ \vdots \\ f_{t+4} \end{bmatrix} \right) + b_g, \quad [1]$$

where $f_t$ is a feature vector representing the LFBE feature vector at time t, M represents maximum likelihood linear transforms ("MLLT"), L is a linear discriminant analysis ("LDA") matrix, and $D_b$ is a block diagonal discrete cosine transform ("DCT") matrix used for computing MFCC feature vectors. $A_g$ and $b_g$ may represent a global affine transform, and may not be present in all embodiments.

Equation [1] may be rewritten as:

$$x_t = \left( T \begin{bmatrix} f_{t-4} \\ f_{t-3} \\ \vdots \\ f_{t+4} \end{bmatrix} \right) + b_g, \quad [2]$$

such that $$x_t = \left( \sum_{k=-4}^{4} T_k f_t + k \right) + b_g. \quad [3]$$

T, which represents $A_g MLD_b$, may be partitioned so that $T=[T_{-4} \ T_{-3} \ \ldots \ T_4]$. In some embodiments, the size of the matrices may be as follows: $x_t$ is 40×1, $f_t$ is 20×1, $D_b$ is 117×180, L is 40×117, M is 40×40, $A_g$ is 40×40, and $b_g$ is 40×1, although other sizes are possible.

At block 306, an affine transform is obtained for a GMM-based acoustic model. In some embodiments, the affine transform is created using cMLLR. The affine transform may have been previously created and correspond to a specific speaker or the affine transform may be created using the audio input. The affine transform may be applied to transform $x_t$ to improve the speech recognition. The affine transform may be represented by $\{A_s, b_s\}$ while $x'_t$ represents the transformed feature vector. The transformed feature vector may be used as an input 114 for a GMM acoustic model. Therefore, $$x'_t = A_s x_t + b_s \quad [4].$$

Here, $x'_t$ may be re-written using the above equation [2] such that $$x'_t = A_s \left[ \left( T \begin{bmatrix} f_{t-4} \\ f_{t-3} \\ \vdots \\ f_{t+4} \end{bmatrix} \right) + b_g \right] + b_s, \quad [5]$$

and $$x'_t = A_s T \begin{bmatrix} f_{t-4} \\ f_{t-3} \\ \vdots \\ f_{t+4} \end{bmatrix} + A_s b_g + b_s. \quad [6]$$

Transforming an input feature vector in this way is already known for a GMM-based acoustic model. This transformed feature vector may not be used in a NN-based model, however, because an NN-based acoustic model may use different feature vectors than a GMM-based acoustic model. However, the affine transform for the GMM-based acoustic model may be used to derive an affine transform for an NN-based acoustic model.

An NN-based acoustic model may use LFBE feature vectors as input. An affine transform for an NN-based acoustic model $\{A_f, b_f\}$ may be applied on LFBE space to calculate an adapted feature vector $\tilde{x}_t$. This feature vector $\tilde{x}_t$ is similar in nature to feature vector x't, but is adapted for an NN-based acoustic model rather than a GMM-based acoustic model. As such, $\tilde{x}_t$ may be similarly written as:

$$\tilde{x}_t = A_f x_t + b_f \quad [7].$$

By substituting in equation [2], this may be rewritten as:

$$\tilde{x}_t = \left(T \begin{bmatrix} A_f f_{t-4} + b_f \\ A_f f_{t-3} + b_f \\ \vdots \\ A_f f_{t+4} + b_f \end{bmatrix}\right) + b_g. \quad [8]$$

This may be written as:

$$\tilde{x}_t = T \begin{bmatrix} A_f & 0 & \cdots & 0 \\ 0 & A_f & 0 & \vdots \\ \vdots & \vdots & \ddots & \vdots \\ 0 & 0 & \cdots & A_f \end{bmatrix} \begin{bmatrix} f_{t-4} \\ f_{t-3} \\ \vdots \\ f_{t+4} \end{bmatrix} + T \begin{bmatrix} b_f \\ b_f \\ \vdots \\ b_f \end{bmatrix} + b_g. \quad [9]$$

At block 308, the affine transform for the NN-based acoustic model $\{A_f, b_f\}$ may be estimated by minimizing two functions. The first function may be used to obtain the linear portion of the affine transform and the second function may be used to obtain the bias portion of the affine transform.

This first function may be, for example, the least squares distance between the corresponding linear terms in equations [6] and [9]. The linear portion of the affine transform for the NN-based acoustic model may be determined by minimizing the first function:

$$\operatorname*{argmin}_{A_f} \left\| A_s T - T \begin{bmatrix} A_f & 0 & \cdots & 0 \\ 0 & A_f & 0 & 0 \\ \vdots & \vdots & \ddots & \vdots \\ 0 & 0 & \cdots & A_f \end{bmatrix} \right\|^2 + \lambda_a \|A_f - I\|^2. \quad [10]$$

The second term of equation [10] may represent a Gaussian prior.

$T_s$ may be defined as $A_s T$ and partitioned as $T_s = [T_{s,-4} \ T_{s,-3} \ \ldots \ T_{s,4}]$. Therefore, equation [10] may be further simplified as:

$$\operatorname*{argmin}_{A_f} \sum_{k=-4}^{4} \|T_{s,k} - T_k A_f\|^2 + \lambda_a \|A_f - I\|^2 = \quad [11]$$

$$\operatorname*{argmin}_{A_f} \sum_{k=-4}^{4} \operatorname{Trace}[(T_{s,k} - T_k A_f)^T (T_{s,k} - T_k A_f)] +$$

$$\lambda_a \operatorname{Trace}[(A_f - I)^T (A_f - I)],$$

so that $A_f$ may be estimated as:

$$A_f = \left(\sum_{k=-4}^{4} T_k^T T_k + \lambda_a I\right)^{-1} \left(\sum_{k=-4}^{4} T_k^T T_{s,k} + \lambda_a I\right). \quad [12]$$

This represents one example of a method for computing the linear portion of the affine transform for the NN-based acoustic model.

The second function may be, for example, the least squares distance between the corresponding bias terms in equations [6] and [9]. The bias portion of the affine transform for the NN-based acoustic model may be determined by minimizing the second function:

$$\operatorname*{argmin}_{b_f} \left\| A_s b_g + b_s - T \begin{bmatrix} b_f \\ b_f \\ \vdots \\ b_f \end{bmatrix} - b_g \right\|^2 + \lambda_b \|b_f\|^2. \quad [13]$$

The terms $(A_s b_g + b_s)$ may be defined as $b'_s$. This allows equation [13] to be simplified as:

$$\operatorname*{argmin}_{b_f} \left\| b'_s - b_g - \sum_{k=-4}^{4} T_k b_f \right\|^2 + \lambda_b \|b_f\|^2. \quad [14]$$

This yields:

$$b_f = \left[\left(\sum_{k=-4}^{4} T_k\right)^T \left(\sum_{k=-4}^{4} T_k\right) + \lambda_b I\right]^{-1} \left[\left(\sum_{k=-4}^{4} T_k\right)^T (b'_s - b_g)\right]. \quad [15]$$

This represents one example of a method for computing the bias portion of the affine transform for the NN-based acoustic model.

At block 310, the resultant affine transform for the NN-based acoustic model $\{A_f, b_f\}$ calculated using equations [12] and [15] may be applied on feature vectors, such as LFBE feature vectors, to calculate the transformed feature vector for an NN acoustic model, $$\tilde{x}_t = A_f x_t + b_f \quad [16].$$

The transformed feature vector can be then used with the NN-based acoustic model to perform automatic speech recognition. The process ends at block 312.

Figure 4:
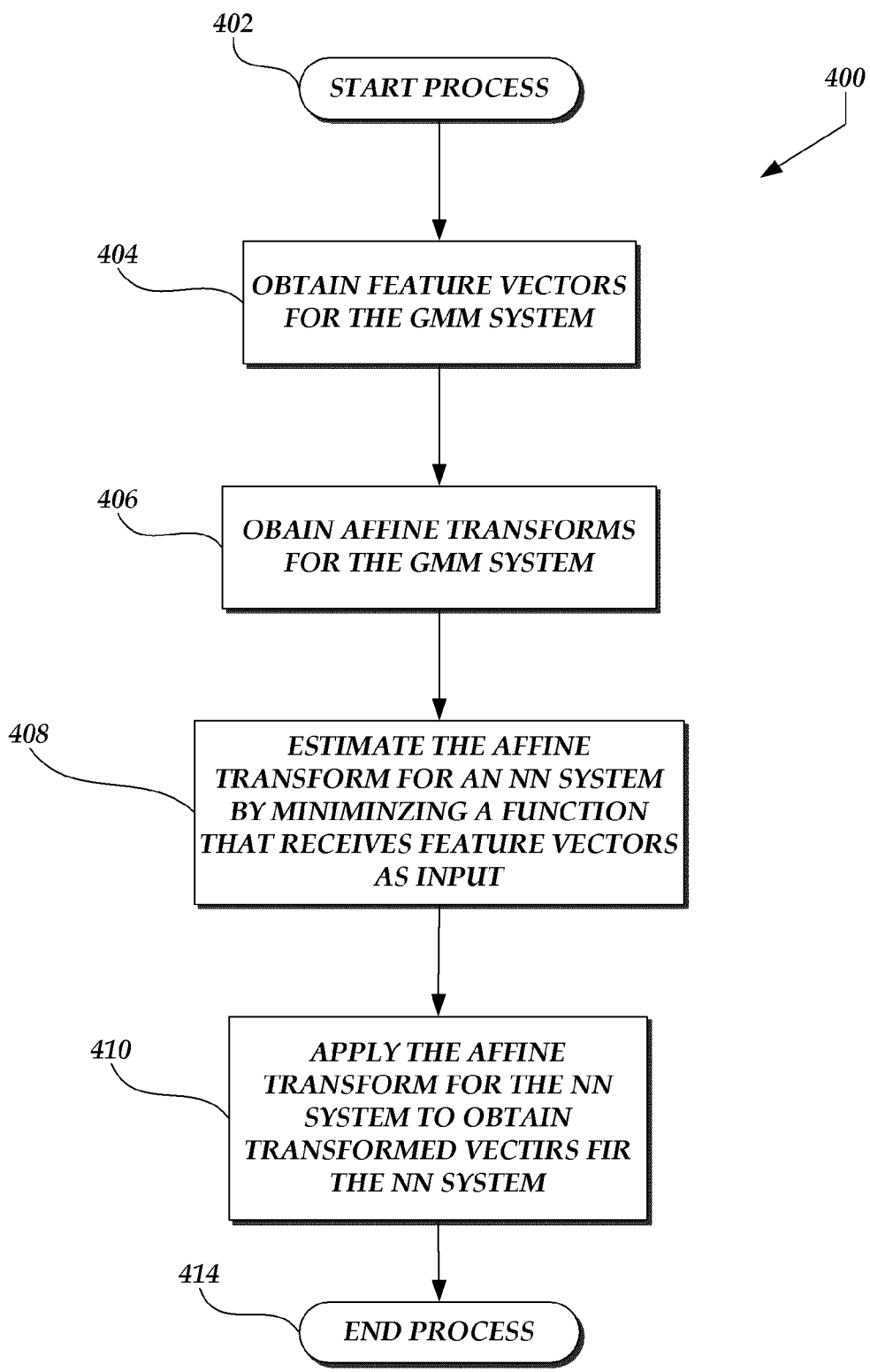
FIG. 4 is a flow diagram of an illustrative process for estimating affine transformations in log filter-bank energy space by minimizing discrepancies between speaker-specific feature vectors in GMM-based acoustic models and NN-based acoustic models.

FIG. 4 illustrates another process 400 for obtaining an affine transform $\{A_f, b_f\}$ for an NN-based acoustic model. The process 400 begins at block 402. The process 400 may be embodied in a set of executable program instructions stored on a computer-readable medium, such as one or more disk drives, of a computer system. When the process 400 is initiated, the executable program instructions can be loaded into memory, such as RAM, and executed by one or more processors of the computer system.

The feature vector $x_t$ for a GMM acoustic model may be obtained, as discussed in greater detail above, at block 404. As discussed above, this feature vector, $x_t$ at time t, may be given by:

$$x_t = \left( T \begin{bmatrix} f_{t-4} \\ f_{t-3} \\ \vdots \\ f_{t+4} \end{bmatrix} \right) + b_g. \qquad [2]$$

As above, an affine transform for a GMM-based acoustic model may be obtained and used to transform feature vector $x_t$. The affine transform for the GMM-based acoustic model may be represented by $\{A_s, b_s\}$, while x represents the transformed feature vector such that $$x'_t = A_s T \begin{bmatrix} f_{t-4} \\ f_{t-3} \\ \vdots \\ f_{t+4} \end{bmatrix} + A_s b_g + b_s. \qquad [6]$$

The transformed feature vector may be used with a GMM-based acoustic model to perform automatic speech recognition.

As above, it may be desired to create an affine transform for an NN-based acoustic model $\{A_f, b_f\}$. The affine transform for the NN-based acoustic model may be applied to feature vectors, such as LFBE feature vectors, to calculate a transformed feature vector $\tilde{x}_t$. This feature vector $\tilde{x}_t$ is comparable to feature vector x but adapted for an NN acoustic model rather than a GMM acoustic model. As such, x may be similarly written as $$\tilde{x}_t = A_f x_t + b_f \qquad [16].$$

Let $W_f = \lfloor A_f b_f \rfloor$ be an affine transform to be estimated for an NN-based acoustic model. Then, using equation [2], $\tilde{x}_t$ may be given by:

$$\tilde{x}_t = \left( T \begin{bmatrix} A_f f_{t-4} + b_f \\ A_f f_{t-3} + b_f \\ \vdots \\ A_f f_{t+4} + b_f \end{bmatrix} \right) + b_g = \left( T \begin{bmatrix} W_f \tilde{f}_{t-4} \\ W_f \tilde{f}_{t-3} \\ \vdots \\ W_f \tilde{f}_{t+4} \end{bmatrix} \right) + b_g. \qquad [17]$$

where $$\tilde{f}_t = \begin{bmatrix} f_t \\ 1 \end{bmatrix}.$$

Process 300 minimizes the least squares distance between corresponding affine transforms for the GMM-based and NN-based acoustic models in order to estimate the affine transform $\{A_f, b_f\}$. Process 400, in contrast, minimizes the least squares distance between the feature vectors themselves, e.g., $x'_t$ and $\tilde{x}_t$, at block 408, in order to calculate $W_f$.

The transformed feature vectors may be close in process 400, while process 300 may instead make the transformed matrices close.

$W_f$ may be determined by minimizing a function such that:

$$\operatorname*{argmin}_{W_f} \sum_t \|x'_t - \tilde{x}_t\|^2 + \lambda \|W_f - [I\ 0]\|^2, \qquad [18]$$

where the second term may represent Gaussian prior centered at an identity matrix. This function receives feature vectors as input as indicated by the presence of $x'_t$ in equation [18]. The above equation [18] may be simplified as:

$$= \operatorname*{argmin}_{W_f} \sum_t \left\| x'_t - \left( \sum_{k=-4}^{4} T_k W_f \tilde{f}_{t+k} \right) - b_g \right\|^2 + \lambda \|W_f - [I\ 0]\|^2 \qquad [19]$$

$$= \operatorname*{argmin}_{W_f} \sum_t \operatorname{Trace}\left[ \left( x'_t - b_g - \left( \sum_{k_1=-4}^{4} T_{k_1} W_f \tilde{f}_{t+k_1} \right) \right)^T \right.$$

$$\left. \left( x'_t - b_g - \left( \sum_{k_2=-4}^{4} T_{k_2} W_f \tilde{f}_{t+k_2} \right) \right) \right] +$$

$$\lambda \operatorname{Trace}[(W_f - [I\ 0])^T (W_f - [I\ 0])]$$

$$= \operatorname*{argmin}_{W_f} \sum_t \operatorname{Trace}\left( \left[ \sum_{k_1=-4}^{4} \sum_{k_2=-4}^{4} W_f^T T_{k_1}^T T_{k_3} W_f \tilde{f}_t +_{k_2} \tilde{f}_{t+k_1}^T \right] - \right.$$

$$2 \left[ \sum_{k_1=-4}^{4} W_f^T T_{k_1}^T (x_t^1 - b_g) \tilde{f}_{t+k_1}^T \right] \right) +$$

$$\lambda \operatorname{Trace}(W_f^T W_f - 2 W_f^T [I\ 0]).$$

This minimization may yield an affine transform $W_f$ by minimizing the least squares distance between the transformed feature vectors. This affine transform can be estimated as:

$$[W_f]_{col-ord} = \left[ \left( \sum_{k_1=-4}^{4} \sum_{k_2=-4}^{4} \left[ \sum_t \tilde{f}_t +_{k_1} \tilde{f}_{t+k_2}^T \right] \otimes [T_{k_1}^T T_{k_2}] \right) + \lambda I \right]^{-1} \qquad [20]$$

$$\left[ \left( \sum_{k_1=-4}^{4} T_{k_1}^T \left[ \sum_t (x'_t - b_g) \tilde{f}_{t+k_1}^T \right] \right) + \lambda [I\ 0] \right]_{col-ord}$$

where the subscript "col-ord" indicates a column-ordered matrix. This estimated affine transform may be applied on feature vectors (e.g., LFBE feature vectors) to obtain a transformed vector $\tilde{x}_t$ for the NN-based acoustic model at block 410.

If there is a large quantity of speaker data, process 400 may be preferable to process 300 as it utilizes more parameters than process 200 when estimating $A_f$ and $b_f$. However, process 300 may give preferable results when less data is available. Further, process 400 may require more data processing. In addition, while process 300 has been described utilizing GMM transformed features calculated with cMLLR, process 400 may be performed on any type of transformed feature and is not limited to cMLLR transformed features. The process ends at block 414.

Sample Environment for Implementing a Speaker-Specific NN-Based ASR Module

Figure 5:
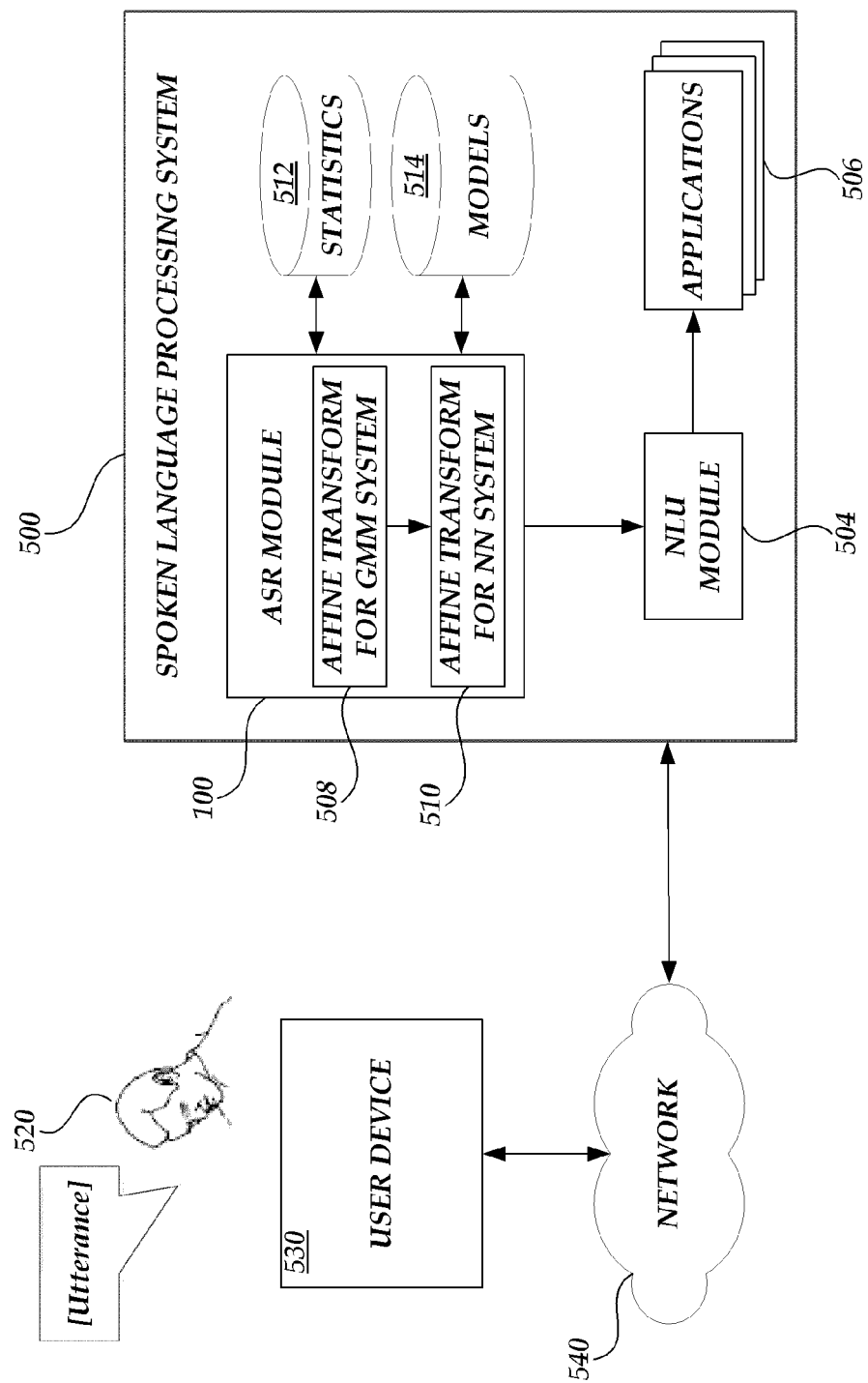
FIG. 5 is a block diagram of a network environment containing a spoken language processing system.

FIG. 5 illustrates an example environment in which a NN-based system processes a given utterance. The NN-based system is adapted for speaker-specific or utterance-specific environments with the help of speaker-specific or utterance-specific affine-transforms features. The environment includes a spoken language processing system 500 and a user device 530. The spoken language processing system 500 can be a network-accessible system in communication with the user device 530 via a communication network 540, such as a cellular telephone network or the Internet or any other network. A user 520 may use the user device 530 to submit utterances, receive information, and initiate various processes, either on the client device 530 or at the spoken language processing system 500.

The client device 530 can correspond to a wide variety of electronic devices. In some embodiments, the client device 530 may be a mobile device that includes one or more processors and a memory which may contain software applications executed by the processors. The client device 530 may include a speaker or other audio output component for presenting or facilitating presentation of audio content. In addition, the client device 530 may contain a microphone or other audio component for accepting speech input on which to perform speech recognition. Illustratively, the client device 530 may include any computing devices such as wireless mobile devices (e.g., smart phones, PDAs, tablets, or the like), desktops, laptops, media player, video game platforms, electronic book readers, television set-top boxes, televisions (e.g., Internet TVs), and computerized appliances, to name a few. The software of the client device 530 may include components for establishing communications over wireless communication networks or directly with other computing devices.

The spoken language processing system 500 can be any computing system that is configured to communicate via a communication network. For example, the spoken language processing system 500 may include any number of server computing devices, desktop computing devices, mainframe computers, and the like. In some embodiments, the spoken language processing system 500 can include several devices physically or logically grouped together, such as an application server computer device configured to perform speech recognition on an utterance and a database server computing device configured to store records and speech recognition models.

The spoken language processing system 500 can include an ASR module 100, an NLU module 504, and one or more applications 506. In some embodiments, the spoken language processing system 500 can include various modules and components combined on a single device, multiple instances of a single module or component, etc. For example, the ASR module 100 may communicate with a statistics data store 512 and a models data store 514 to process audio input. The ASR module 100 may use an affine transform for a GMM-based acoustic model 508 to further refine a speaker-specific or environment-specific affine transformation for an NN-based acoustic model 510. In multi-device implementations, the various devices of the spoken language processing system 500 may communicate via an internal communication network such as a corporate or university network configured as a local area network ("LAN") or a wide area network ("WAN"). In some cases, the devices of the spoken language processing system 500 may communicate over an external network, such as the Internet, or a combination of internal and external networks.

In some embodiments, the features and services provided by the spoken language processing system 500 may be implemented as web services consumable via a communication network 540. In further embodiments, the spoken language processing system 500 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 540 may be a publicly accessible network of linked networks, possibly operated by various distinct parties, such as the Internet. In other embodiments, the network 540 may include a private network, personal area network ("PAN"), LAN, WAN, cable network, satellite network, etc. or some combination thereof, each with access to and/or from the Internet. For example, the devices of the spoken language processing system 500 may be located within a single data center, and may communicate via a private network as described above. The client device 530 may communicate with the spoken language processing system 500 via the Internet. The client device 530 may have access to the Internet via a wired or WiFi connection, or via a cellular telephone network (e.g., a Long Term Evolution or LTE network).

The spoken language processing system 500 illustrated in FIG. 5 includes an ASR module 100 to process and transcribe the utterance. The ASR module 100 can output one or more likely transcriptions. For example, the ASR module 100 may output a lattice or N-best list of likely transcriptions. In some embodiments, the lattice or N-best list may include scores indicating a confidence in each transcription or portion of each transcription. The ASR module 100 may include a speaker-specific, environment-specific, or utterance-specific affine transform 510. The spoken language processing system 500 may use an NLU module 504 to determine the user intent based on the output from the ASR module 100.

Various applications, such as the application 506 of FIG. 5, can use the output of the NLU module 504 to respond to user utterances or take actions in response to user utterances. Separate applications 506 may be implemented within the spoken language processing acoustic model 500 to perform different tasks. For example, the spoken language processing acoustic model 500 may include separate applications 506 for playing music, providing directions, performing searches, purchasing products, providing personal information management (e.g., calendars or contacts) and the like.

While an artificial neural network has been discussed in terms of speech recognition, artificial neural networks may be used for a number of different types of processing. They may be used, for example, for image recognition or handwriting recognition. The use of speech recognition is intended to illustrate, rather than limit, this invention.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of one or more computing devices configured with specific computer-executable instructions,
      obtaining a Gaussian mixture model-based ("GMM-based") acoustic model;
      obtaining a neural network-based ("NN-based") acoustic model;
      receiving an audio signal comprising speech;
      computing a first sequence of feature vectors from the audio signal;
      computing a GMM-based transform using the GMM-based acoustic model and the first sequence of feature vectors, wherein the GMM-based transform comprises a first linear portion and a first bias portion;
      computing a second linear portion of a NN-based transform by minimizing a first least squares difference function, wherein the first least squares difference function comprises a difference between the second linear portion and the first linear portion;
      computing a second bias portion of the NN-based transform by minimizing a second least squares difference function, wherein the second least squares difference function comprises a difference between the second bias portion and the first bias portion;
      computing a second sequence of feature vectors from the audio signal;
      computing a third sequence of feature vectors by applying the second linear portion and the second bias portion of the NN-based transform to the second sequence of feature vectors;

performing speech recognition using the third sequence of feature vectors and the NN-based acoustic model generate speech processing results; and determining, using the speech processing results, an action to perform.

2. The computer-implemented method of claim 1, wherein an input to the first least squares difference function comprises the second sequence of feature vectors.

3. The computer-implemented method of claim 1, wherein the second sequence of feature vectors comprises log filter bank energy ("LFBE") vectors.

4. The computer-implemented method of claim 1, wherein the first linear portion comprises a first matrix, wherein the second linear portion comprises a second matrix, wherein the first bias portion comprises a first column vector, and wherein the second bias portion comprises a second column vector.

5. The computer-implemented method of claim 1, wherein computing the third sequence of feature vectors comprises:

multiplying a vector of the second sequence of feature vectors by the second linear portion of the NN-based transform to generate a first product; and adding the first product to the second bias portion of the NN-based transform to generate a vector of the third sequence of feature vectors.

6. The computer-implemented method of claim 1, wherein computing the GMM-based transform comprises using constrained maximum likelihood linear regression ("cMLLR").

7. A system comprising:

a computer-readable memory storing executable instructions; and one or more processors in communication with the computer-readable memory, wherein the one or more processors are programmed by the executable instructions to at least:

obtain a Gaussian mixture model-based ("GMM-based") acoustic model;

obtain a neural network-based ("NN-based") acoustic model;

compute a first sequence of feature vectors from audio data;

compute a first transform using the GMM-based acoustic model and the first sequence of feature vectors, wherein the first transform comprises a first linear portion and a first bias portion;

compute a second linear portion of a NN-based transform by minimizing a first least squares difference function, wherein the first least squares difference function comprises a difference between the first linear portion and the second linear portion;

compute a second bias portion of the NN-based transform by minimizing a second least squares difference function, wherein the second least squares difference function comprises a difference between the first bias portion and the second bias portion;

compute a second sequence of feature vectors from an audio signal comprising user speech;

compute a third sequence of feature vectors by applying the second linear portion and the second bias portion to the second sequence of feature vectors;

perform speech recognition on the audio signal using the third sequence of feature vectors and the NN-based acoustic model; and determine using results of the speech recognition, an action to perform.

8. The system of claim 7, wherein the audio data comprises the audio signal.

9. The system of claim 7, wherein the audio data was obtained using training data.

10. The system of claim 7, wherein an input to the first function comprises the second sequence of feature vectors or a fourth sequence of feature vectors computed from the audio data.

11. The system of claim 7, wherein the second sequence of feature vectors comprises log filter bank energy ("LFBE") vectors.

12. The system of claim 7, wherein the first transform and NN-based transform are computed using constrained maximum likelihood linear regression ("cMLLR").

13. The system of claim 7, wherein the executable instructions to compute the third sequence of feature vectors comprise instructions to multiply a feature vector of the second sequence of feature vectors by the second portion of the NN-based transform, wherein the second portion of the NN-based transform comprises a matrix.

14. One or more non-transitory computer readable media comprising executable code that, when executed, cause one or more computing devices to perform a process comprising:

obtaining a Gaussian mixture model-based ("GMM-based") acoustic model;

obtaining a neural network-based ("NN-based") acoustic model;

computing a first sequence of feature vectors from audio data;

computing a first transform using the GMM-based acoustic model and the first sequence of feature vectors, wherein the first transform comprises a first linear portion and a first bias portion;

computing a second linear portion of a NN-based transform by minimizing a first least squares difference function, wherein the first least squares difference function comprises a difference between the first linear portion and the second linear portion;

computing a second bias portion of the NN-based transform by minimizing a second least squares difference function, wherein the second least squares difference function comprises a difference between the first bias portion and the second bias portion;

computing a second sequence of feature vectors from an audio signal comprising speech;

computing a third sequence of feature vectors by applying the second linear portion and the second bias portion to the second sequence of feature vectors;

performing speech recognition on the audio signal using the third sequence of feature vectors and the NN-based acoustic model; and determining, using results of the speech recognition, an action to perform.

15. The one or more non-transitory computer readable media of claim 14, wherein the process further comprises computing the first sequence of feature vectors from audio data comprising the audio signal.

16. The one or more non-transitory computer readable media of claim 14, wherein the process further comprises obtaining the audio data using training data.

17. The one or more non-transitory computer readable media of claim 14, wherein the process further comprises inputting the second sequence of feature vectors or a fourth sequence of feature vectors computed from the audio data into the first function.

18. The one or more non-transitory computer readable media of claim 14, wherein the process further comprises computing the second sequence of feature vectors from LFBEs.

19. The one or more non-transitory computer readable media of claim 14, wherein the process further comprises computing the first transform and NN-based transform using constrained maximum likelihood linear regression ("cMLLR").

20. The one or more non-transitory computer readable media of claim 14, wherein computing the third sequence of feature vectors comprises adding the second portion of the NN-based transform to a product of a matrix and a feature vector of the NN-based sequence of feature vectors, and wherein the NN-based portion of the second transform comprises a vector.

* * * * *